C. Perley,
Fitting Windlasses.
No. 1,603. Reissued Jan. 12. 1864.
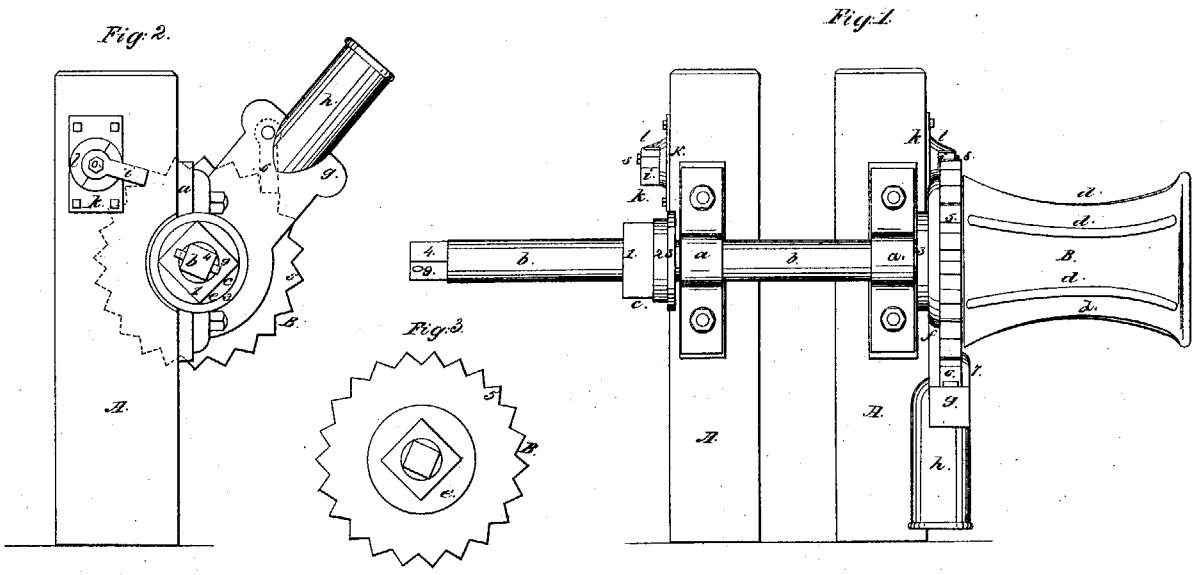
Witnesses:
Wm. Geo. Harold.
Chas. H. Smith.
Inventor
Charles Perley
AM. PHOTO-LITHO. CO. N.Y. (OSBORNE'S PROCESS)

UNITED STATES PATENT OFFICE.

CHARLES PERLEY, OF NEW YORK, N. Y.

IMPROVED METHOD OF FITTING THE HEAVING SOCKET AND HEAD OF WINDLASSES.

Specification forming part of Letters Patent No. 6,873, dated November 13, 1849; extended November 13, 1863; Reissue No. 1,603, dated January 12, 1864.

*To all whom it may concern:*

Be it known that I, CHARLES PERLEY, of the city and State of New York, have invented, made, and applied to use a certain new and useful Improvement in the Method of Fitting the Heaving Socket and Head of Windlasses; and I do hereby declare the following to be a full, clear, and exact description of the said invention, reference being had to the annexed drawings, making part of this specification, wherein—

Figure 1 is an elevation of my windlass with one of the heads removed. Fig. 2 is an elevation of the same, and Fig. 3 is an elevation of the inner or larger end of the windlass-head.

Similar marks of reference denote the same parts.

Before the invention of my present improvement the heads of windlasses were secured to the shafts by means of wedges or keys, and in consequence of rust speedily became immovably attached to said shaft. The result of this was that a head could not be removed if broken or injured, and, as the handspike-sockets before employed were liable to be broken, they were placed at the outer or smaller end of the windlass, in order that they might be replaced if broken, and in consequence of applying the heaving socket at the outer end the chain or rope could not be easily slipped on or off, and the ratchet-teeth were liable to injure such ropes, and the shaft of the windlass was exposed to unnecessary strain by the leverage at the end thereof.

My invention removed all these objectionable features from the windlasses formerly employed. The first part of said invention consists in fitting the head and parts connecting it to the shaft in such a manner that it can be easily removed and another introduced in its place, or the other parts of the windlass repaired when injured. The second part of said invention consists in a handspike-heaver applied at the inner or larger end of the windlass-head, said handspike-heaver being mounted on a disk or plate surrounding the shaft and carrying the pawl that takes the ratchet-teeth upon said head.

A A may represent the windlass-bits as ordinarily used, on which the windlass is fitted, with the barrel between them, but this is not shown. *a a* are bearings carrying the necks or journals of the windlass shaft or spindle *b* which in this construction should be made of a uniform diameter from end to end, instead of being reduced at the necks and ends as is often the practice in the common windlass. *c* is a cast-metal boss or hub, keyed or otherwise secured on the shaft, having a square, 1, and a round part, 2, upon which a wrought-metal band, 3, may be fitted and shrunk on, and the outer ends of the shaft may be reduced nearly into a square, 4.

B is the windlass-head, made with or without whelps *d*, as usual, and a bush, *e*, countersunk and secured in any convenient manner, may be used at the larger end of the head, as seen in Fig. 3, which bush is formed with a square hole the size of the square 1 on the shaft *b*. The outer end of the head B is made with a square in the center to fit the square 4 on the end of the shaft *b*. The larger end of the head B is formed with ratchet-teeth 5, made at about an angle of forty-five degrees, with the radial line, which take a stop-pawl, *i*, held by a pin, 8, on a plate, *k*, set on the bits A with a backing-flange, *l*, behind the pawl.

On the round part of the boss 2, between the head and the band 3, a metal annular disk, *f*, forming a wide collar, is placed, with one edge extended and formed as a box, *g*, overlying the ratchet-teeth 5 with a guide-plate, 7, on the opposite side of the ratchet-teeth, and carrying between the sides the pawl 6, shown best by dotted lines in Fig. 2. The outer portion of this box forms a base on which a cylinder forming a socket, *h*, for the handspike is cast or forged solid, the whole forming a handspike-heaver. When all these parts are in place, the head B is secured from sliding off the shaft by a pin, 9, (see Figs. 1 and 2,) or by any other convenient device.

When thus fitted, the sockets *h* for the handspikes, when not in use, will assume the position shown in Fig. 1, in which it will be out of the way of injury, and when required for use the sockets are to be elevated to the position shown in Fig. 2 and handspikes placed in them, and the two alternately worked, as in the common pump-brake.

On the up-motion the pawls will pass over the ratchet-teeth 5, and on the commencement of the downward motion fall into and move the ratchet and head B with the spindle; or a spring may be used to throw the pawl into place, and the backing-pawl *i* takes the strain on the upward motion of the breaks, and is sustained by the shoulder or backing-flange *l*, thus relieving the pin 8 from any strain and making the pawl less liable to injury by the operation of any weight on the windlass body or head. The results effected by this change in the construction of windlasses are, first, that the heaving and torsional strain is thrown on the head, and the spindle has less strain on it than in any of the ordinary modes of fitting, particularly where the head and spindle are keyed together at their outer ends only, or fitted only with a square and pin at the end. The second result is that by the mode of fitting the bush *e* into the inner end of the head a fracture destroying the head will generally detach the fragments from the bush *e* and in any case leave the boss and spindle uninjured. The third result, consequent on the second, is that an injured head or heaving socket and disk can either or both be rep'aced by the crew of the ship shifting off the old and putting on the new parts, thus saving expense and adding materially to the general security of the ship and all on board her.

What I claim, and desire to secure by Letters Patent, is—

1. A windlass-head fitted at the inner end upon a polygonal boss that is attached to the shaft or spindle, whereby the head can be easily removed, as set forth.

2. A handspike-heaver fitted to take the teeth at the inner or larger end of the windlass-head, substantially as and for the purposes specified.

In witness whereof I have hereunto set my signature this 3d day of December, A. D. 1863.

CHARLES PERLEY.

Witnesses:

THOS. GEO. HAROLD,
CHAS. H. SMITH.